United States Patent
Rofougaran

(10) Patent No.: US 7,865,138 B2
(45) Date of Patent: Jan. 4, 2011

(54) METHOD AND SYSTEM FOR A LOW-COMPLEXITY MULTI-BEAM REPEATER

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 470 days.

(21) Appl. No.: 12/058,077

(22) Filed: Mar. 28, 2008

(65) Prior Publication Data

US 2009/0247075 A1    Oct. 1, 2009

(51) Int. Cl.
*H04B 7/14* (2006.01)
*H04K 3/00* (2006.01)

(52) U.S. Cl. .......................... 455/17; 455/20
(58) Field of Classification Search ............... 455/7–22; 370/315; 375/211
See application file for complete search history.

(56) References Cited

U.S. PATENT DOCUMENTS

| | | | |
|---|---|---|---|
| 6,898,721 B2 * | 5/2005 | Schmidt | 713/322 |
| 7,138,884 B2 | 11/2006 | Cheung et al. | |
| 2004/0222506 A1 | 11/2004 | Wei et al. | |
| 2008/0233864 A1 * | 9/2008 | Rofougaran et al. | 455/11.1 |
| 2009/0247213 A1 * | 10/2009 | Rofougaran | 455/550.1 |

* cited by examiner

*Primary Examiner*—Lee Nguyen
(74) *Attorney, Agent, or Firm*—McAndrews, Held & Malloy, Ltd.

(57) ABSTRACT

Aspects of a method and system for a low-complexity multi-beam repeater may include receiving one or more information signals at one or more receiver antennas, and receiving one or more local oscillator control signals via an out-of-band link. The one or more received information signals may be demodulated to one or more intermediate-frequency signals via one or more frequency carrier signals, wherein the frequency carrier signals may be controlled by the one or more received local oscillator control signals. One or more intermediate-frequency signals and/or one or more signals generated from the one or more intermediate-frequency signals may be modulated to one or more radio-frequency signals via the one or more frequency carrier signals. One or more transmit signals comprising at least one of the one or more radio-frequency signals may be transmitted via one or more transmit antennas.

20 Claims, 3 Drawing Sheets

METHOD AND SYSTEM FOR A LOW-COMPLEXITY MULTI-BEAM REPEATER

CROSS-REFERENCE TO RELATED APPLICATIONS/INCORPORATION BY REFERENCE

Not applicable.

FIELD OF THE INVENTION

Certain embodiments of the invention relate to signal processing for communication systems. More specifically, certain embodiments of the invention relate to a method and system for a low-complexity multi-beam repeater.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones, smartphones, Personal Digital Assistants (PDAs) that incorporate a large range of communication technologies and associated software. For example, fully-featured web-browsers, email clients, MP3 players, instant messenger software, and Voice-over-IP may all be found on some recent devices. The various communications may occur at different transmission and/or reception bands.

Given the varying demands of users, service providers and device manufacturers have to support media content comprising voice, video and/or data compliant with many different communication standards, specifications and/or data formats. Additionally, as the number of electronic devices enabled for wired and/or mobile communications continues to increase, significant efforts exist with regard to making such devices smaller and lighter. In this regard, designers find themselves in a never ending quest to include more functionality in less space. However, shrinking device and technology sizes leads to a multitude of design issues.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a low-complexity multi-beam repeater, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a low-complexity multi-beam repeater. Aspects of a method and system for a low-complexity multi-beam repeater may comprise receiving one or more information signals at one or more receiver antennas, and receiving one or more local oscillator control signals via an out-of-band link. The one or more received information signals may be demodulated to one or more intermediate-frequency signals via one or more frequency carrier signals, wherein the frequency carrier signals may be controlled by the one or more received local oscillator control signals. One or more intermediate-frequency signals and/or one or more signals generated from the one or more intermediate-frequency signals may be modulated to one or more radio-frequency signals via the one or more frequency carrier signals. One or more transmit signals comprising at least one of the one or more radio-frequency signals may be transmitted via one or more transmit antennas.

The one or more frequency carrier signals may comprise one or more in-phase carrier signals and/or one or more quadrature phase carrier signals. One or more processed intermediate-frequency signals may be processed in an intermediate-frequency processing block. The number of the one or more transmit antennas, and the number of the one or more receive antennas may be arbitrary. One or more of the one or more frequency carrier signals may be substantially similar in frequency. The one or more received signal and the one or more transmit signal may be in the 60 GHz band. A plurality of the intermediate-frequency signals received from one or more receiver antennas may be combined. The processed intermediate-frequency signals may be generated for the one or more transmit antennas in accordance with multiple antenna transmission protocols. Radio frequency interference may be reduced during the adjustment of the receive frequencies.

Figure 1:
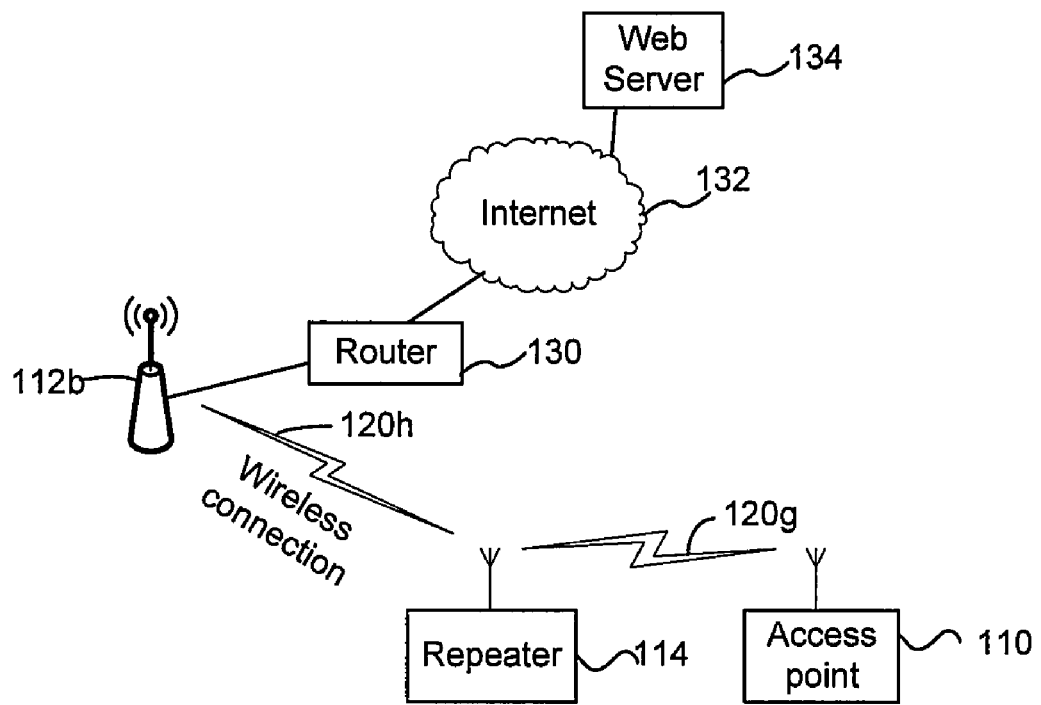
FIG. 1 is a diagram illustrating an exemplary wireless communication system, in accordance with an embodiment of the invention.

FIG. 1 is a diagram illustrating an exemplary wireless communication system, in accordance with an embodiment of the invention. Referring to FIG. 1, there is shown an access point 112*b*, a router 130, the Internet 132, a web server 134, access point 110, repeater 114, and wireless connections 120*g*, and 120*h*.

The access point 110 may comprise suitable logic, circuitry and/or code that may be enabled to receive, process, and/or transmit radio signals. The access point 110 may communicate with other devices such as the repeater 113 via high-data rate short range communications. For example, Ultrawideband communications and/or 60 GHz communications may be used for short range communications because of their use of limited power and/or high transmission frequencies.

The access point 112*b* may comprise suitable logic, circuitry and/or code that may be enabled to transmit and receive radio frequency signals for data communications, for example via the repeater 114. The access point 112*b* may also be enabled to communicate via a wired network, for example, with the router 130. The wireless access point 110, and the repeater 114 and the access point 112*b* may be compliant with one or more communication protocols, for example, Wireless LAN (WLAN, IEEE 802.11), Bluetooth, Ultrawideband, or 60 GHz communications.

The repeater 114 may comprise suitable logic, circuitry and/or code that may be enabled to receive, process, and/or transmit radio signals. The repeater 114, may communicate with other devices such as the access point 110 via high-data rate short range communications. For example, Ultrawideband communications and/or 60 GHz communications may be utilized to provide the high-data rate short range communications because of their use of limited power and/or high transmission frequencies. The repeater 114 may be enabled to extend a communication range of, for example, the access point 110 and/or the access point 112b. For example, the repeater 114 may be enabled to provide communications between the access point 110 and the access point 112b so as to extend the communication range of the access point 110.

The router 130 may comprise suitable logic, circuitry and/or code that may be enabled to communicate with communication devices that may be communicatively coupled to it, for example access point 112b or the Internet 132.

The Internet 132 may comprise suitable logic, circuitry and/or code that may be enabled to interconnect and exchange data between a plurality of communication devices.

The web server 134 may comprise suitable logic, circuitry and/or code that may be enabled to communicate with communication devices that may be communicatively coupled to it, for example the Internet 132.

The wireless connection 120g illustrates a connection established between the access point 112b and the repeater 114. The wireless connection 120h illustrates a wireless connection established between the repeater 114 and the access point 110.

In operation, it may be desirable for the access point 110 to communicate, for example, with the web server 134. In this case, the access point 110 may establish a connection to the Internet via an access point 112b, and a router 130. In some instances, the access point 110 may be located outside of the radio range or communication range of the access point 112b. In these instances, it may be desirable to establish a communications path via a repeater 114 between the access point 110 and the access point 112b. Such a connection may be illustrated by the wireless connection 120h and the wireless connection 120g.

In accordance with various embodiments of the invention, it may be desirable that the repeater 114 may maintain a plurality of communication session concurrently, for example with the access point 112b and the access point 110. For example, a plurality of wireless connections 120g, and 120h may be active at any given time instant. In these instances, better performance may be achievable if the wireless connection 120h and the wireless connection 120g are not be operated on the same transmission frequency so as to reduce interference. Accordingly, various embodiments of the invention may enable, for example, the repeater 114, to provide communication with reduced interference. The local oscillator frequencies to generate the carrier signals for receiving and transmitting may be controlled via an out-of-band link, for example Bluetooth, WLAN.

Figure 2:
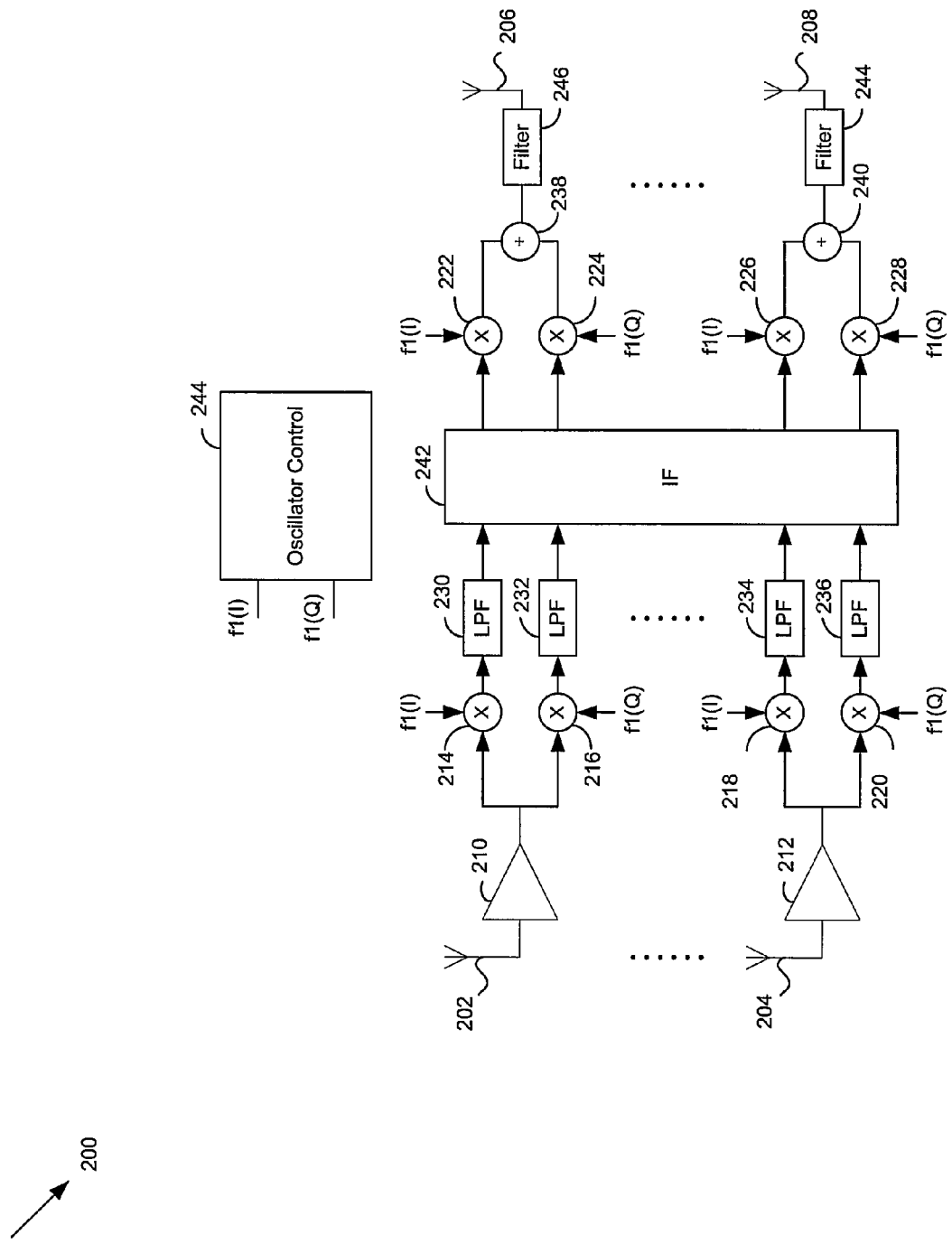
FIG. 2 is a diagram illustrating an exemplary repeater architecture 200, in accordance with an embodiment of the invention.

FIG. 2 is a diagram illustrating an exemplary repeater architecture 200, in accordance with an embodiment of the invention. Referring to FIG. 2, there is shown a repeater 200. The repeater 200 may comprise an oscillator control 244, antennas 201, 202, 206, and 208, amplifiers 210 and 212, and a plurality of multipliers 214, 216, 218, 220, 222, 224, 226 and 228. There is also shown low-pass filters (LPFs) 230, 232, 234, and 236, filters 246 and 244, an intermediate frequency processing block 242, and adders 238 and 240. There is also shown the oscillator signals f1(I), and f1(Q), which may communicatively couple the oscillator control 244 to the plurality of multipliers 214 through 228. The repeater 200 may, for example, be substantially similar to the one or more repeaters 114.

The one or more antennas 202 to 204 of the repeater 200 may comprise suitable logic, circuitry and/or code that may be enabled to receive a information signal. In accordance with various embodiments of the invention, the antennas 202 through 204 may, for example, receive the wireless connection 120h from access point 112b. In some instances, there may a plurality of receive antennas, as illustrated in FIG. 2. In another embodiment of the invention, there may be one receive antenna, for example, antenna 202.

The amplifiers 210 and 212 may be substantially similar, and may comprise suitable logic, circuitry, and or code that may be enabled to generate a low-noise amplified signal at the output that may be proportional to the input signal.

The multipliers 214, 216, 218, 220, 222, 224, 226, and 228 may comprise suitable logic, circuitry and/or code that may be enabled to generate an in-phase RF signal component by multiplication of the signal from the intermediate frequency processing block 242 and an in-phase carrier frequency f1(I). Similarly, a quadrature RF signal component may be generated in multiplier 224 by multiplication of a signal from the intermediate frequency processing block 242 and a quadrature RF signal component f1(Q). The in-phase RF signal and the quadrature RF signal may be added in the adder 238, to form a composite RF signal. The carrier frequencies f1(I) and f1(Q) may be controlled via an out-of-band link, for example Bluetooth and/or WLAN. In some instances, a mobile telephony radio standard may be used.

The low-pass filters (LPFs) 230, 232, 234, and 236 may comprise suitable logic, circuitry and/or code that may be enabled to attenuate undesirable frequencies. For example, the filter 246 may be used to attenuate undesirable frequencies, and the signal at the output of the filter 246 may be transmitted via antenna 206. Similarly, other intermediate frequency in-phase and quadrature signal components may be generated at the intermediate frequency processing block 242, and multiplied with in-phase and quadrature carrier frequencies at, for example, the multipliers 226 and 228 to generate a composite RF signal at the output of the adder 240 for transmission via antenna 208 and filter 244. The low-pass filters 230 and 232 may remove or significantly attenuate some undesirable frequencies. An intermediate in-phase frequency component from the output of the filter 230 may be communicatively coupled to the intermediate frequency processing block 242. Similarly, an intermediate quadrature frequency component from the output of the filter 232 may be communicatively coupled to the intermediate frequency processing block 242. Similarly, an intermediate in-phase frequency component and an intermediate quadrature frequency component may be generated from a signal received at antenna 204, for example, via the multipliers 218 and 220, and the LPFs 234 and 236. By choosing desirable filtering characteristics in the filters 246 through 244, the transmission frequency may be chosen differently from the receiver frequencies, thereby reducing interference.

The intermediate frequency processing block 242 may comprise suitable logic, circuitry and/or code that may be enabled to process a plurality of intermediate frequency signals. For example, the intermediate frequency processing block 242 may be enabled to suitably process the received signals for transmission via the one or more antennas 206 through 208. The intermediate frequency processing block 242 may generate an in-phase and a quadrature signal component for modulation and transmission via one or more transmit antennas. For example, a first in-phase signal component may be coupled from the intermediate frequency processing block 242 to the multiplier 222.

The filters, for example filter 246 may be enabled to attenuate undesirable frequencies, and the signal at the output of the filter 246 may be transmitted via antenna 206. Similarly, other intermediate frequency in-phase and quadrature signal components may be generated at the intermediate frequency processing block 242, and multiplied with in-phase and quadrature carrier frequencies at, for example, the multipliers 226 and 228 to generate a composite RF signal at the output of the adder 240 for transmission via antenna 208 and filter 244. In accordance with various embodiments of the invention, the adders 238 and 240 may perform a subtraction or an addition, and may weigh the signal components to be processed. In some instances, it may be desirable to adjust the phases of f1(I), f1(Q), f2(I), f2(Q), f3(I), f3(Q), f4(I), and f4(Q) to allow desirable signal selection.

The oscillator control 244 may comprise suitable logic, circuitry and/or code that may be enabled to generate a plurality of oscillator frequencies that may be enabled to control the transmit modulation frequencies and receive demodulation frequencies at the multipliers 214, 216, 218, 220, 222, 224, 226, and 228, for example. In some instances, a desirable choice of the oscillator signal frequency, for example for f1(I) and/or f1(Q), may reduce radio interference for the received signals and/or the transmit signals. By choosing desirable frequencies f1(I) and f1(Q), the transmit and receive frequencies may be set so as to avoid interference between each other, and other radio signals.

The signal received at antennas 202 through 204 via, for example, wireless connection 120h, may be communicated to amplifiers 210 through 212. The output signal of amplifier 210 may be communicatively coupled to the multipliers 214 and 216. The multiplier 214 may demodulate the received signal to an intermediate frequency by multiplying with an in-phase carrier frequency f1(I). Hence, multiplier 214 may generate a signal comprising the in-phase component of the received signal. Similarly, the multiplier 216 may generate a signal comprising the quadrature component of the received signal, by multiplying the received signal with a quadrature carrier frequency f1(Q). In many instances, the in-phase carrier frequency signal may be 90 degrees phase-shifted from the quadrature carrier frequency signal.

In an exemplary embodiment of the invention, a received signal at antenna 202 may be on a carrier frequency of 62 GHz, and the modulation/demodulation frequencies f1(I) and f1(Q) may be at 60 GHz. Hence, the intermediate frequency may be at 2 GHz, for example. After modulation and suitable filtering in the multipliers 222, 224, the adder 238 and the filter 246, the transmitted signal may be at a frequency of 60 GHz-2 GHz=58 GHz. This may be achieved by suitable selection of the modulation band generated in the adder 238 and the multipliers 222 and 224.

In accordance with various embodiments of the invention, the exemplary repeater 200 may be used to receive one or more RF signals and re-transmit them at one or more RF frequencies, which may generally be different from the receive frequencies. In some instances, the transmit frequencies may be selected to be similar or equal to the receive frequencies.

In some instances, multiple antennas may permit multiple antenna processing of received signals, for example for beamforming or diversity reception and/or transmission. Similarly, the processed intermediate-frequency signals generated in the intermediate frequency processing block 242 may be in accordance with various multiple antenna transmission protocols, for example MIMO, transmit diversity, or beamforming.

Figure 3:
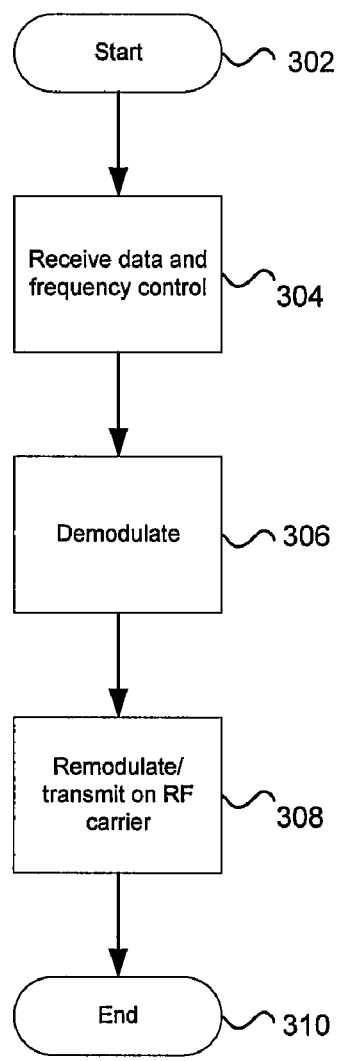
FIG. 3 is a flow chart illustrating an exemplary RF repeater process, in accordance with an embodiment of the invention.

FIG. 3 is a flow chart illustrating an exemplary RF repeater process, in accordance with an embodiment of the invention.

In step 304, a repeater, for example repeater 114 may receive data from another access point, for example access point 112b, which may be destined to an access point 110. Also, a repeater 114 may receive frequency control information via an out-of-band link, which may be used to control the oscillator frequency to generate the carrier frequencies, for example f1(I) and f1(Q). In step 306, the repeater 114 may demodulate the received signal via the in-phase and quadrature carrier frequencies as illustrated in FIG. 2. After the demodulation to intermediate frequency, the received signal may be processed in accordance with various multiple antenna protocols, in accordance with various embodiments of the invention. In step 308, the processed intermediate frequency signal may be remodulated and transmitted over one or more transmit antennas, for example antennas 206 through 208, as illustrated in FIG. 2.

In accordance with an embodiment of the invention, a method and system for a low-complexity multi-beam repeater may comprise receiving one or more information signals at one or more receiver antennas, for example antennas 202 and 204, and receiving one or more local oscillator control signals via an out-of-band link, for example at the oscillator control 244. The one or more received information signals may be demodulated to one or more intermediate-frequency signals via one or more frequency carrier signals, wherein the frequency carrier signals may be controlled by the one or more received local oscillator control signals. For example, the local oscillator frequencies f1(I) and f1(Q) as illustrated in FIG. 2 may be used to demodulate received signal at the multipliers 214, 216, 218, and 220. One or more intermediate-frequency signals and/or one or more signals generated from the one or more intermediate-frequency signals, for example in the IF processing block 242, may be modulated to one or more radio-frequency signals via the one or more frequency carrier signals. Modulation may be achieved at the multipliers 222, 224, 226, and 228, for example. One or more transmit signals comprising at least one of the one or more radio-frequency signals may be transmitted via one or more transmit antennas, for example the antennas 206 and/or 208.

The one or more frequency carrier signals may comprise one or more in-phase carrier signals and/or one or more quadrature phase carrier signals. One or more processed intermediate-frequency signals may be processed in an intermediate-frequency processing block 242. The number of the one or more transmit antennas 206 through 208, and the number of the one or more receive antennas 202 through 204 may be arbitrary. One or more of the one or more frequency carrier signals may be substantially similar in frequency, for example the carrier signals used at multiplier 222 and at multiplier 226. The one or more received signal and the one or more transmit signal may be in the 60 GHz band. A plurality of the intermediate-frequency signals received from one or more receiver antennas may be combined, as described for FIG. 2. The processed intermediate-frequency signals may be generated for the one or more transmit antennas in accordance with multiple antenna transmission protocols. Radio frequency interference may be reduced during the adjustment of the receive frequencies.

Another embodiment of the invention may provide a machine-readable storage, having stored thereon, a computer program having at least one code section executable by a machine, thereby causing the machine to perform the steps as described herein for a method and system for a low-complexity multi-beam repeater.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
    receiving one or more information signals at one or more receiver antennas;
    receiving one or more local oscillator control signals via an out-of-band link;
    demodulating said one or more received information signals to one or more intermediate-frequency signals via one or more frequency carrier signals, wherein said frequency carrier signals are controlled by said one or more received local oscillator control signals;
    modulating said one or more intermediate-frequency signals, and/or one or more signals generated from said one or more intermediate-frequency signals, to one or more radio-frequency signals via said one or more frequency carrier signals; and
    transmitting one or more transmit signals comprising at least one of said one or more radio-frequency signals via one or more transmit antennas.

2. The method according to claim 1, wherein said one or more frequency carrier signals comprise one or more in-phase carrier signals and/or one or more quadrature phase carrier signals.

3. The method according to claim 1, comprising generating said one or more processed intermediate-frequency signals in an intermediate-frequency processing block.

4. The method according to claim 1, wherein the number of said one or more transmit antennas, and the number of said one or more receive antennas is arbitrary.

5. The method according to claim 1, wherein one or more of said one or more frequency carrier signal are substantially similar in frequency.

6. The method according to claim 1, wherein said one or more received signal and said one or more transmit signal are in the 60 GHz band.

7. The method according to claim 1, comprising combining a plurality of said intermediate-frequency signals received from one or more receiver antennas.

8. The method according to claim 1, comprising generating said processed intermediate-frequency signals for said one or more transmit antennas in accordance with multiple antenna transmission protocols.

9. The method according to claim 1, comprising reducing radio frequency interference during said adjustment of said receive frequencies.

10. The method according to claim 1, comprising reducing radio frequency interference during said adjustment of said transmit frequencies.

11. A system for processing communication signals, the system comprising:
    one or more circuits operable to:
        receive one or more information signals at one or more receiver antennas;
        receive one or more local oscillator control signals via an out-of-band link;
        demodulate said one or more received information signals to one or more intermediate-frequency signals via one or more frequency carrier signals, said frequency carrier signals controlled by said one or more received local oscillator control signals;
        modulate said one or more intermediate-frequency signals, and/or one or more signals generated from said one or more intermediate-frequency signals, to one or more radio-frequency signals via said one or more frequency carrier signals; and
        transmit one or more transmit signals comprising at least one of said one or more radio-frequency signals via one or more transmit antennas.

12. The system according to claim 11, wherein said one or more frequency carrier signals comprise one or more in-phase carrier signals and/or one or more quadrature phase carrier signals.

13. The system according to claim 11, wherein said one or more circuits generate said one or more processed intermediate-frequency signals in an intermediate-frequency processing block.

14. The system according to claim 11, wherein the number of said one or more transmit antennas, and the number of said one or more receive antennas is arbitrary.

15. The system according to claim 11, wherein one or more of said one or more frequency carrier signal are substantially similar in frequency.

16. The system according to claim 11, wherein said one or more received signal and said one or more transmit signal are in the 60 GHz band.

17. The system according to claim 11, wherein said one or more circuits combine a plurality of said intermediate-frequency signals received from one or more receiver antennas.

18. The system according to claim 11, wherein said one or more circuits generate said processed intermediate-frequency signals for said one or more transmit antennas in accordance with multiple antenna transmission protocols.

19. The system according to claim 11, wherein said one or more circuits reduce radio frequency interference during said adjustment of said receive frequencies.

20. The system according to claim 11, wherein said one or more circuits reduce radio frequency interference during said adjustment of said transmit frequencies.

* * * * *